June 26, 1934.        R. C. FOLGER        1,964,685
PROCESS OF TREATING SILICEOUS MATERIAL AND
THE MANUFACTURE OF CEMENT THEREFROM
Filed May 23, 1932
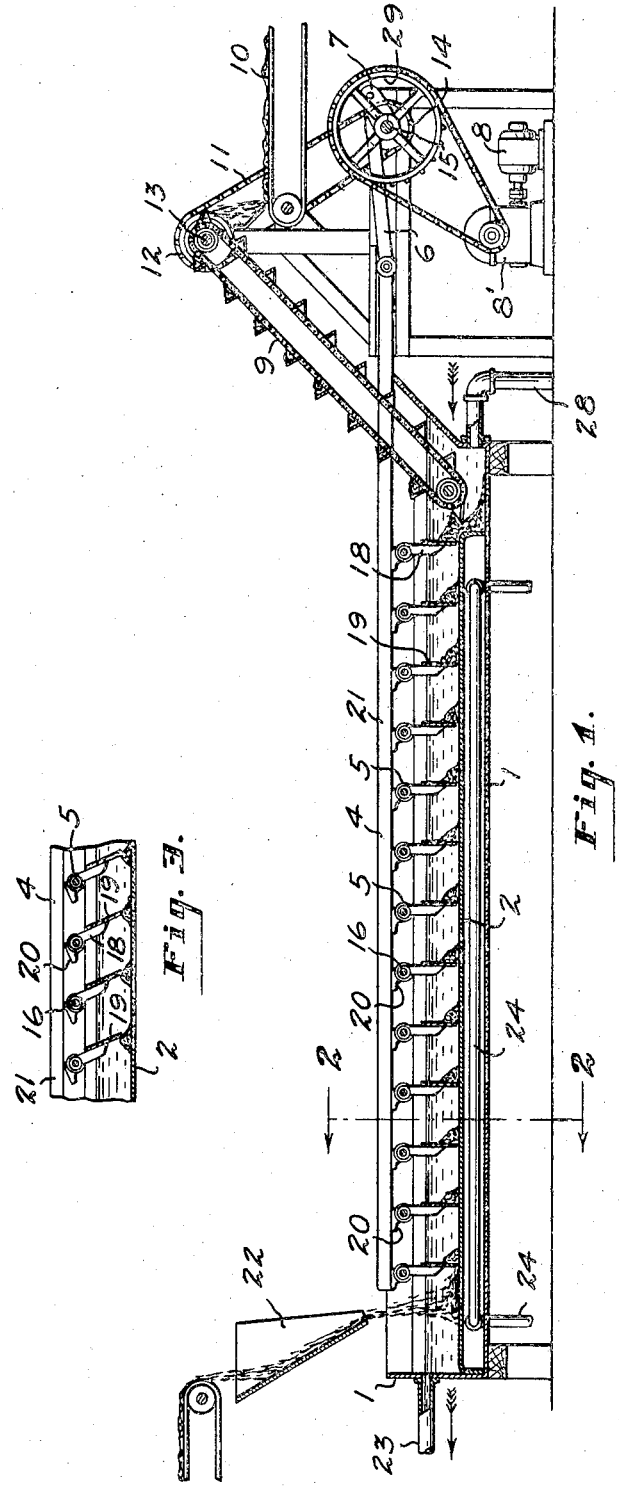
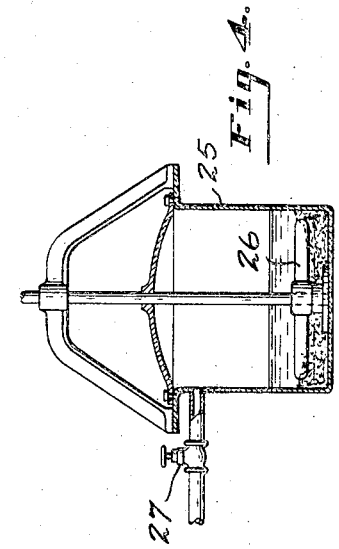
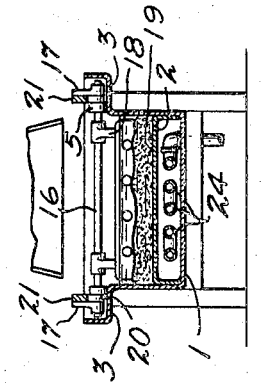
INVENTOR
*Roy C. Folger*
BY
ATTORNEYS Patented June 26, 1934

1,964,685

UNITED STATES PATENT OFFICE 1,964,685

PROCESS OF TREATING SILICEOUS MATERIAL AND THE MANUFACTURE OF CEMENT THEREFROM

Roy C. Folger, Dearborn, Mich., assignor to The Electric Smelting & Aluminum Co., Cleveland, Ohio, a corporation of Ohio Application May 23, 1932, Serial No. 613,004

15 Claims. (Cl. 106—25)

My invention relates to the process of removing alkali metal impurities from alkaline earth metal silicates, and more particularly to a process of removing alkali metal compounds from dicalcium silicate obtained as a residue in the extraction of alumina from aluminous siliceous material, and to the utilization of the product thus formed in the manufacture of Portland cement and the like.

In extracting alumina from aluminous siliceous material, such as bauxite, kaolin, feldspar, leucite or coal ashes, the aluminous siliceous material is mixed with an alkaline earth metal compound, such as lime, limestone or calcium carbonate, and an alkali metal compound, such as sodium carbonate, in suitable proportions. The charge is then sintered and the soluble alkali metal aluminate extracted by means of hot water or a dilute alkaline solution, leaving a residue composed principally of dicalcium silicate. The proportions of the ingredients in the charge may be considerably varied, but as a rule the ratio of the calcium oxide, or its equivalent, to the silica will be in the molecular proportion of approximately 2 to 1 and the molecular proportion of the alkali metal oxide, or its equivalent, to the alumina may be varied from approximately 1 to 1.7 alkali metal oxide, or its equivalent, to 1 part alumina. It has also been determined that a better yield of alumina may be obtained if the ingredients of the charge are mixed in such proportion that the molecular ratio of alkali metal aluminate to dicalcium silicate in the sinter is approximately 1 to 1 or higher.

My invention, however, is not directed broadly to the process of extracting alumina from aluminous siliceous material, but relates more particularly to the treatment of the siliceous residue obtained after the sodium or other alkali metal aluminate has been extracted, so that it may be commercially utilized in the industrial arts, and more particularly as the principal ingredient in the manufacture of Portland, or other cements.

In extracting alumina from aluminous siliceous material, it has been found difficult to remove all the alkali metal compounds, such as sodium aluminate or zeolitic compounds containing sodium, which are formed in the process. If the sodium or other alkali metal compounds are allowed to remain in the residue after the extraction process, an inversion occurs which causes the formation of compounds, such as calcium aluminate and more or less complex sodium aluminate silicates, such as zeolites. The failure to completely remove the alkali metal compounds not only causes a loss of valuable alkaline material but leaves alkali metal compounds in the siliceous material which detracts from its value for commercial purposes, such as its use in the manufacture of Portland cement.

It is therefore one of the principal objects of my invention to subject an alkaline earth metal silicate, such as dicalcium silicate residue, containing alkali metal compounds as impurities, to a treatment which will render it more valuable as a material in the manufacture of cement.

Another object of my invention is to recover in valuable form, the alkali metal compounds existing as impurities in alkaline earth metal silicates.

A further object of my invention is to provide an improved cement in which dicalcium silicate substantially free from alkali metal compounds constitutes one of the principal ingredients.

A still further object of my invention is to subject an alkaline earth metal silicate, such as dicalcium silicate, to a treatment whereby the alkali metal content of the alkaline earth metal silicate will be reduced so as to render it more suitable as a raw material in the manufacture of cement.

Another and more specific object of my invention is to treat the alkaline earth metal silicous residue obtained in the extraction of alumina, from aluminous siliceous material, with an alkaline earth metal compound, such as calcium chloride, which is capable of reacting with alkali metal compounds which may be present in the residue to form a soluble alkali metal compound which may be readily extracted from the residue.

In practicing my invention an alkaline earth metal silicate, such as dicalcium silicate, calcium metasilicate, or a mixture containing either or both of these silicates mixed with a silicate of magnesium, may be suspended in water or treated directly with calcium chloride or a solution of an alkaline earth metal compound which is capable of entering into a base exchange reaction with the alkali metal compounds that are present in the alkaline earth metal silicates. When it is desired to treat the residue formed in the extraction of alumina from aluminous siliceous material, I prefer to utilize the dicalcium silicate in the form in which it comes from the extraction plant. A solution of an alkaline earth compound which will react with the alkali metal compounds present in the residue to cause a base exchange and form a water soluble compound in which the alkali metal base forms the positive radical, is added. Any suitable alkaline earth metal compound which is soluble in water and which is capable of forming a base exchange reaction with the alkali metal compounds to form a water soluble alkali metal compound, may be employed, such as the halides of strontium, barium or calcium.

I prefer to utilize calcium chloride because it is soluble in water, relatively inexpensive, and reacts readily with alkali metal compounds. The alkali earth metal silicate may be treated with the calcium chloride or other alkaline earth metal halide specified above, in any suitable manner.

For example, the dicalcium silicate residue obtained in the extraction of alumina from aluminous-siliceous material may be treated with an aqueous solution of calcium chloride, preferably by stirring or agitation, for a sufficient length of time to cause the calcium chloride to come into intimate contact with all parts of the residue and react with the alkali metal compounds which are present.

When the dicalcium silicate is treated in a single tank of the ordinary construction, I prefer to heat and agitate the mixture to accelerate the reaction. In such cases, I may utilize a closed digester and heat the mixture to form a pressure in the reaction vessel, or steam may be utilized for this purpose.

In the commercial operation of the process, in which a large amount of the dicalcium silicate is being treated, I prefer to provide a continuous process in which the dicalcium silicate is carried in one direction through the treating tank and a solution of the calcium compound is caused to flow in the opposite direction.

Several methods of practicing my invention are disclosed in the accompanying drawing, in which Figure 1 is a cross-sectional view of a tank showing a continuous process in which the dicalcium silicate is conveyed through the tank in a direction opposite to the flow of the calcium chloride solution;

Fig. 2 is a cross-sectional view on the line 2—2 of Fig. 1;

Fig. 3 is a fragmentary view of the scraper mechanism disclosed in Fig. 1, showing the scrapers in a different position; and Fig. 4 is a cross-sectional view of a digester for treating dicalcium silicate with a solution of calcium chloride.

It will be understood that the drawing is merely illustrative, as any desirable method may be employed which will serve to bring the dicalcium silicate or dicalcium silicate residue into intimate contact with an aqueous solution of the calcium chloride.

A suitable apparatus for practicing my invention in a continuous manner is illustrated in Figs. 1, 2 and 3 of the drawing in which the numeral 1 designates a tank having a false bottom 2. The upper portion of the tank has outwardly and upwardly extending flanges providing a shoulder 3 which serves as a support for a suitable conveying mechanism 4. The conveying mechanism is supported on the shoulder 3 by rollers 5 and is adapted to be moved backward and forward by means of pitmen 6. The pitmen are reciprocated by means of cranks 7 attached to a shaft 15. The shaft 15 is operated by a pulley 29 driven from any suitable source of power, such as a motor 8. A suitable speed reducing unit 8' may be interposed between the motor 8 and the shaft 15.

As the dicalcium silicate is moved to the forward end of the tank, a conveyor 9 removes it from the tank 1 and deposits it upon an additional conveying mechanism 10. The conveyor 9 is operated by the belt 11 connected to a pulley 12 affixed to the shaft 13 of the conveying mechanism and a pulley 14 affixed to the shaft 15 which supports the cranks 7.

The conveyor mechanism 4 is provided with a series of rods or shafts 16 which are journaled in suitable bearings 17. Affixed to the rod 16 and extending downwardly therefrom is a scraper mechanism having a rigid portion 18 and a thin perforated extension 19. The shafts 16 are provided at each end with lugs 20 which, in one position of the scraper mechanism are adapted to bear against the under side of longitudinal strips 21 attached to the bearings 17.

In practicing my invention in accordance with this method, the dicalcium silicate is poured through a hopper 22 and deposited on the false bottom 2 of the tank 1. As the scraper mechanism is moved rearward the scrapers pass over the material deposited on the false bottom 2, but when it is moved forward the lugs 20 contact with the longitudinal strips 21 and the material is gradually moved to the forward portion of the tank. During the passage of the material through the tank a solution of calcium chloride is passed through the tank in the reverse direction by means of an entrance pipe 28, and passes outwardly through the rearward end of the tank through a pipe 23. If desired, the solution of calcium chloride may be heated in its passage through the tank by any suitable means, such as steam pipes 24. As illustrated in the drawing, this is accomplished by means of steam pipes passing through water or other suitable liquid maintained in the compartment formed by the false bottom 2.

I do not desire to limit my invention, however, to a continuous method of treating the material, as obviously it may be treated in a digester such as that illustrated in Fig. 4 of the drawing. In this modification the dicalcium silicate and solution of calcium chloride are placed in the digester 25 and the material stirred by suitable means, such as an agitator 26. During treatment the material may be heated by any convenient means, such as external heat, although if desired steam coils may be employed. If the material is heated, a steam exhaust valve 27 may be provided.

The concentration of the calcium chloride utilized may be varied over a wide range, that is, from more than appreciable amounts up to saturation. I have found that when calcium chloride having a concentration of approximately 10% is passed in a counterwise direction to that in which the siliceous residue is being carried so that the fresh calcium chloride comes in contact with the more nearly purified dicalcium silicate, as illustrated in Fig. 2, it is not necessary to supply heat to the treating tank.

As previously stated, my process is especially desirable for removing alkali metal compounds, such as sodium or potassium compounds, from the siliceous residue resulting from the extraction of alkali metal aluminate from aluminous siliceous material, so as to render the siliceous residue especially valuable as an ingredient in the manufacture of Portland cement.

In former practice the dicalcium silicate remaining after the extraction of the alumina was washed with water to recover as much of the valuable alkali metal aluminate as possible and either wasted or utilized as a fill for low lands.

In view of its lime and siliceous content it has been utilized to some extent as a fertilizer and has proved to be of special value as a corrector of soil acidity and as a source of plant food. The market for the material as a plant food, however, has been comparatively limited. Attempts have also been made to utilize it in the manufacture of Portland cement, but its value in this character has been limited because of its relatively high alkali metal content. The lack of an available market and the large quantity of dicalcium silicate remaining as a residue in the extraction of alumina from aluminous siliceous material, even at prices which would pay for the cost of disposal of the material alone, has therefore greatly impeded the recovery of alumina from such sources.

A typical analysis of the dicalcium silicate resulting from the extraction of alumina from aluminous siliceous material is substantially as follows:

| | |
|---|---|
| Silica | 30.3 |
| Alumina | 7.1 |
| Iron oxide | 2.0 |
| Calcium oxide | 49.1 |
| Magnesium oxide | 3.3 |
| Loss on ignition | 2.2 |
| Sodium oxide | 6.0 |

By analytical research it has been found that the alkali metal content of the dicalcium silicate residue resulting from the extraction of alumina from aluminous siliceous material occurs as undecomposed silicates, as alkali metal compounds in various forms such as hydroxides, carbonates or aluminates, and as zeolitic compounds caused by a partial reversion of the furnacing reaction, whereby the alkali metal aluminate reacts with the dicalcium silicate to produce hydrated zeolitic compounds containing alkali metal compounds, alumina, lime, silica and water.

In the manufacture of Portland cement it is very desirable to have as low an alkali metal content as possible. Of course, a small quantity of alkali metal is volatilized in the burning process but if the alkali metal content of the raw ingredients is high some will remain in the finished cement. Excessive alkali metal compounds in cement are objectionable because they cause erratic setting or efflorescence in hydrated cement or concrete in which the material is used. The alkali metal compounds appear to absorb water and dissolve, and when the solution evaporates a white deposit is left on the surface of concrete or other structures in which the material is utilized. These white deposits not only disfigure the surfaces but render the material open to suspicion, thereby reducing the commercial value of the cement.

By treating the dicalcium silicate residue according to my process, I am able to remove practically all the alkali metal occurring as oxides, hydroxides, carbonates or aluminates, and as zeolitic compounds which are formed by the reaction of alkali metal aluminates with dicalcium silicate. I have found that when an aluminous siliceous material that has a low alkali metal compound content, such as kaolin or bauxite, is utilized in the alumina extraction process, I am able to prepare a dicalcium silicate which is substantially free from alkali metal compounds. It is not necessary, however, that the aluminous siliceous material utilized in the alumina extraction process be free from alkali metal compounds, as I am able by my improved process to remove the major proportion of these compounds and since some of the alkali metal content is removed during the burning of the cement, the amount of alkali metal compounds in the finished cement will not be in excess of 1.5% and will usually be below .75%.

In treating the dicalcium silicate residue with the calcium chloride solution it is highly desirable, although not absolutely essential, to treat the residue with calcium chloride immediately after the sodium aluminate has been extracted, and this is especially true when the residue contains some sodium aluminate because, if the residue is allowed to stand, a reaction occurs between the sodium compounds and ingredients in the residue, forming compounds such as calcium aluminate, and more or less complex sodium aluminate silicates, such as zeolites. It has been found that if the material is allowed to stand for considerable length of time, this reaction increases and the compounds formed become more stable in character. In such cases it is therefore necessary to treat the residue for a longer time, or with a more concentrated solution of calcium chloride to effect the removal of the alkali metal.

The following specific example will serve to illustrate and explain my invention, although it will be understood that I do not desire to limit myself to the specific proportions of ingredients mentioned therein.

The damp residue resulting from the extraction of alumina from kaolin was thoroughly leached with successive treatments of hot water. The residue was then treated with a 4% calcium chloride solution at 90° to 95° C. for an hour with occasional stirring, and then filtered and washed. One liter of calcium chloride solution was used for each lot of 500 grams of material in the residue. The material was then washed. At the end of the treatment it was found that the amount of sodium oxide in the residue was reduced from 4.05% to 3%. Upon suitable treatment with a more concentrated solution of calcium chloride, the alkali content may be reduced to less than 1%. The calcium chloride not only reduces the sodium content but, since the reaction is one in which a base exchange occurs, it also increases the calcium content which is a desirable ingredient in the manufacture of Portland cement.

Sufficient limestone was added to the above residue so that the ingredients were present in excess of 2.5 parts by molecular weight of calcium oxide to 1 part of silica. For example, the ingredients may be present in substantially the following molecular proportions:

2.8 CaO to 1 SiO₂
2 CaO to 1 Al₂O₃
2 CaO to 1 Fe₂O₃

The proportions of the ingredients as calculated from the raw materials were substantially as follows:

| | Per cent |
|---|---|
| SiO₂ | 23.1 |
| Al₂O₃ | 4.2 |
| Fe₂O₃ | 3.0 |
| TiO₂ | .7 |
| CaO | 64.9 |
| MgO | 2.1 |
| Na₂O | Less than 1.5 |

A sample of the material was burned in a rotary kiln at a temperature of 1100° C. and another sample at 1545° C. Both the low temperature cement and the Portland cement (1545° C.) passed the soundness test satisfactorily when hydrated in moist air. The addition of 2% of gypsum increases the setting time and improves the strength. The burning of the material also reduced the alkali content in the finished product to less than 1%. Hydrated cement or concrete in which the material is utilized is therefore free from erratic setting and efflorescence.

From the foregoing specification it will be apparent that my process is especially valuable because it enables the utilization of a material for which there is only a slight commercial demand at the present time in the manufacture of a highly valuable product.

Since the sodium compound which is utilized in the extraction of alumina from aluminous siliceous material is practically all recovered and again utilized in the process, and the dicalcium silicate residue has been the only ingredient for which there has heretofore been no large commercial demand, my process is instrumental in reducing the cost of the extraction of alumina from inexpensive and readily obtainable materials.

My improved process also enables the recovery of valuable alkali metal compounds from the siliceous residue and as the result of the base exchange reaction which occurs the calcium content is increased, which renders the siliceous residue more valuable as an essential ingredient of Portland cement.

It will be understood that the composition of siliceous material remaining as a residue in the extraction of alumina from aluminous siliceous material usually contains dicalcium silicate as the principal ingredient. However, other compounds may be present, such as small percentages of iron oxide, alumina and magnesium oxide in addition to the alkali metal compound impurities. Alumina and iron oxide in the small proportions in which they are present are usually believed to be beneficial and the small amounts of other ingredients do not adversely affect the properties of the cement. It will be understood that for the purposes of this invention magnesium silicate is considered equivalent to an alkaline earth metal silicate.

While I have described my invention in considerable detail and have amplified the description with specific examples, it will be understood that the examples should be construed as illustrative and not by way of limitation, and in view of the numerous modifications which may be effected therein without departing from the spirit and scope of my invention it is desired that only such limitations shall be imposed as are indicated in the appended claims.

What I claim is:

1. The process of treating a siliceous residue consisting predominately of dicalcium silicate and containing alkali metal compounds, which comprises treating the material with a solution of calcium chloride, thereby producing a substantially insoluble calcium compound and soluble alkali metal chlorides, and removing the alkali metal chlordes from the dicalcium silicate.

2. The process of treating the siliceous residue resulting from the extraction of alumina from aluminous siliceous material, which comprises treating the material with a calcium compound that is capable of reacting with alkali metal compounds present in the residue to form soluble compounds having an alkali metal base, and removing the soluble compound from the residue.

3. The process of treating the siliceous residue resulting from the extraction of alumina from aluminous siliceous material, which comprises treating the material with calcium chloride, thereby forming insoluble calcium compounds and soluble alkali metal chlorides and removing the soluble chlorides from the residue.

4. The process of treating the siliceous residue resulting from the extraction of alumina from aluminous siliceous material, which comprises treating the residue under heat and pressure with a solution of a calcium compound that is capable of reacting with alkali metal compounds to form soluble alkali metal compounds which may be readily removed from the residue.

5. A continuous process of treating the siliceous residue resulting from the extraction of alumina from aluminous siliceous material, which comprises passing the siliceous residue through a tank while subjecting it to the action of a solution of calcium chloride which is being passed through the tank in a counter direction.

6. The process of preparing an improved raw material for the manufacture of Portland cement, which comprises treating the siliceous residue resulting from an alumina extraction process, with calcium chloride, thereby causing a reaction whereby soluble chlorides of the alkali metals are produced and may be removed and insoluble compounds of calcium are formed, thus increasing the calcium content of the material.

7. The process of preparing an improved raw material for the manufacture of Portland cement, which comprises treating a material consisting predominately of dicalcium silicate and containing zeolites, with calcium chloride, thus causing a base exchange reaction whereby the alkali metal of the zeolite is replaced by calcium and an alkali metal chloride is formed, thus increasing the calcium content of the raw material and forming a soluble alkali metal chloride.

8. The process of preparing Portland cement, which comprises treating the siliceous residue resulting from the extraction of alumina from an aluminous siliceous material, with a calcium compound that is capable of reacting with an alkali metal to form a soluble alkali metal compound, removing the alkali metal compounds, adding limestone, and burning the product at a sufficient temperature to form Portland cement.

9. The process of preparing cement, which comprises treating the siliceous residue resulting from the extraction of alumina from aluminous siliceous material, with calcium chloride, thereby increasing the calcium content and forming soluble chlorides, removing the soluble chlorides, adding limestone, and burning the material at a sufficient temperature to form cement.

10. The process of preparing Portland cement, which comprises treating the siliceous residue resulting from the extraction of alumina from aluminous siliceous material, with calcium chloride, thereby increasing the calcium content and forming a soluble alkali metal chloride, removing the alkali metal chloride, adding sufficient limestone so that the molecular ratio of calcium oxide to silica will be greater than 2.5 to 1 and burning the mixture at a sufficient temperature to form Portland cement.

11. The process of treating aluminous siliceous material, which comprises mixing the material with an alkali metal compound and an alkaline earth metal compound, sintering the mixture, extracting the alkali metal aluminate and then treating the siliceous residue with a solution of an alkaline earth metal compound which will react with alkali metal compounds which may be present in the residue to form one or more soluble compounds which may be removed from the residue.

12. The process of treating aluminous siliceous material, which comprises mixing the material with sodium carbonate and an alkaline earth metal compound, sintering the mixture, extracting the sodium aluminate which is formed, and then treating the siliceous residue with a solution of an alkaline earth metal compound that will react with alkali metal compounds that may be present in the residue.

13. The process of treating aluminous siliceous material, which comprises mixing the material with an alkali metal compound and an alkaline earth metal compound, sintering the mixture, extracting the sodium aluminate and then treating the residue with calcium chloride to remove alkali metal compounds from the residue.

14. The process of preparing cement, which comprises mixing aluminous siliceous material with an alkali metal compound and an alkaline earth metal compound, sintering the mixture, extracting the alkali aluminate thus formed, treating the residue with an alkaline earth metal compound that will react with alkali metal compounds in the residue to form soluble alkali metal compounds, removing the alkali metal compounds, adding limestone, and burning the material at a sufficient temperature to form cement.

15. The process of preparing cement, which comprises mixing aluminous siliceous material with sodium carbonate and calcium carbonate, sintering the mixture, extracting the sodium aluminate thus formed, treating the residue with a solution of calcium chloride, removing the alkali metal chlorides thus formed, mixing the residue with limestone, and burning at a sufficient temperature to form cement.

ROY C. FOLGER.